June 3, 1958     E. W. HAWKINSON     2,836,855
TIRE RETREADING MOLD

Filed Oct. 5, 1954     2 Sheets-Sheet 1

INVENTOR.
Earle W. Hawkinson
BY
Merchant & Merchant
ATTORNEYS

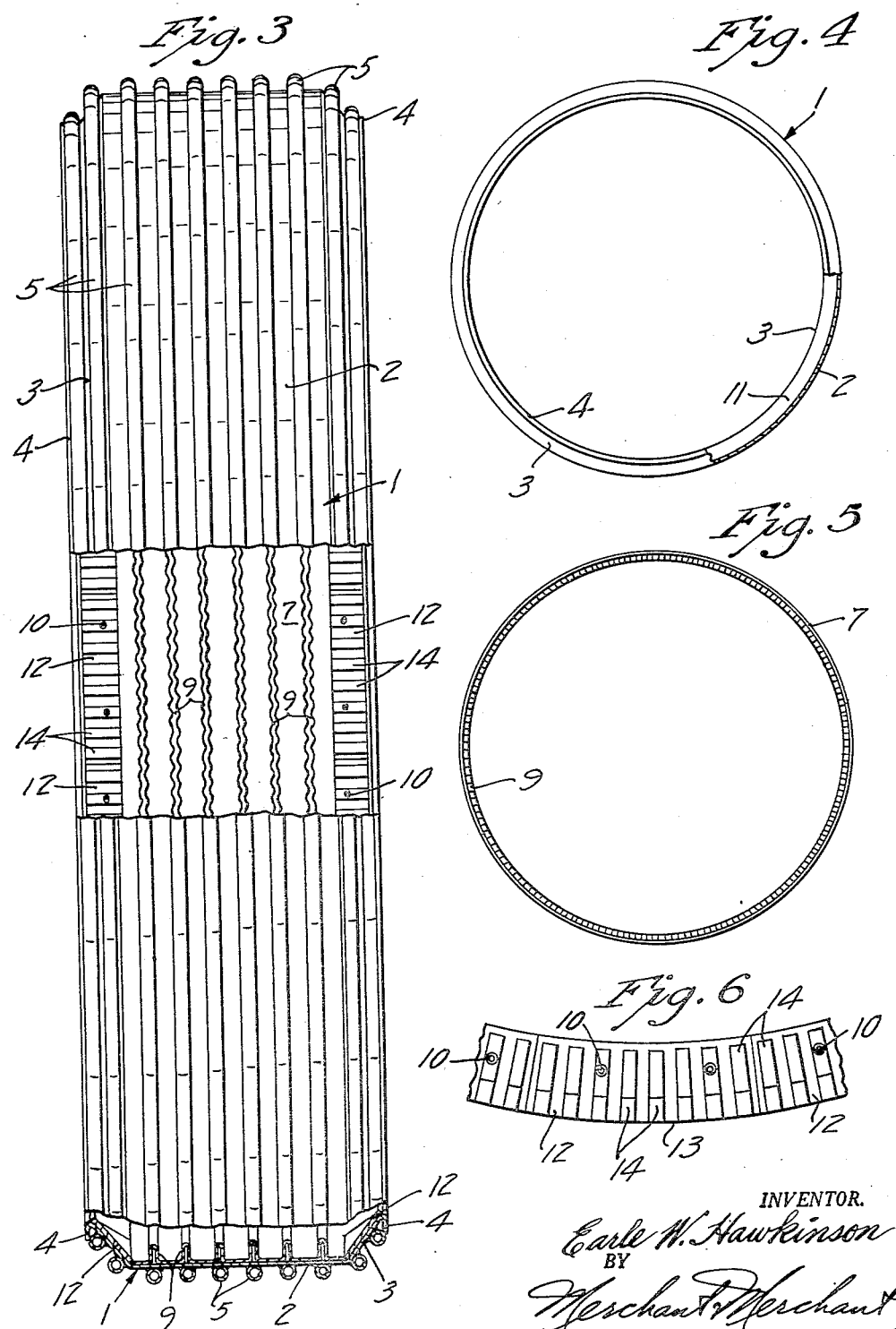

United States Patent Office 2,836,855
Patented June 3, 1958

2,836,855

TIRE RETREADING MOLD

Earle W. Hawkinson, Minneapolis, Minn., assignor to Paul E. Hawkinson Company, Minneapolis, Minn., a corporation of Minnesota Application October 5, 1954, Serial No. 460,407

2 Claims. (Cl. 18—44)

My invention relates to improvements in tire retreading equipment and, more particularly, to improvements in retreading molds of the type known commercially as "Hawkinson", and which are in the nature of unbroken sheet metal rings or bands of a diameter less than the normal diameter of the casing, whereby to require spreading of the beads of the pneumatic tire casings curable therewith to enter same thereinto and remove same therefrom. Such molds have relatively shallow confining flanges at their margins and, hence, apply a relatively shallow top cap. Patent No. 2,526,746 well illustrates these features. Such top caps normally do not blend well into the side walls of a tire and are, hence, objected to by some for their appearance.

The primary object of my invention is the provision of a novel retreading mold of the type generally above described, which has relatively deep marginal tread material confining flanges, and which is constructed in a manner to be relatively inexpensive to produce, is relatively light in weight, but durable, and which will lend itself to various but attractive designs.

The above and still further objects and advantages of my invention will become apparent from the following detailed specification, appended claims, and attached drawings.

Referring to the drawing wherein like characters indicate like parts throughout the several views:

Fig. 3 is a view in front elevation, some parts being broken away and some parts shown in section;

Fig. 4 is a view in side elevation of the mold element, some parts being broken away and some parts shown in section;

Fig. 5 is a view in side elevation of the matrix member of my novel structure; and Fig. 6 is an enlarged fragmentary view of one of the segmental matrix sections of my novel structure.

Figure 1:
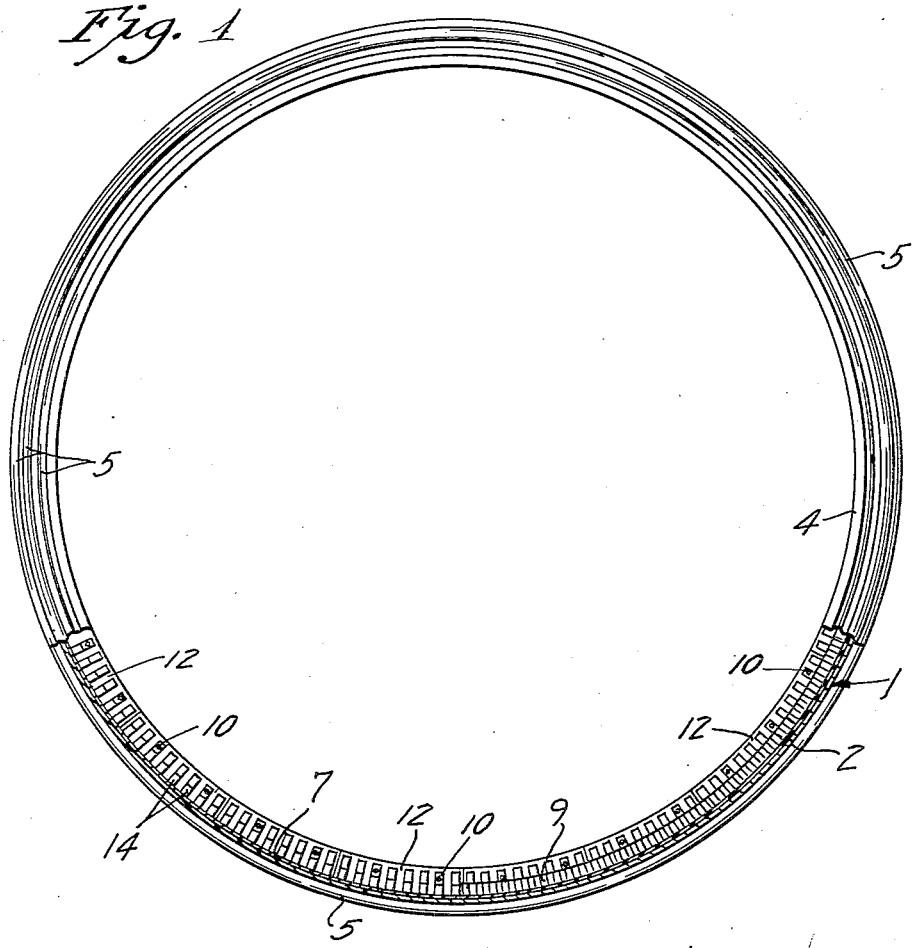
Fig. 1 is a view in side elevation of my novel mold, some parts being broken away and some parts shown in section.
Figure 2:
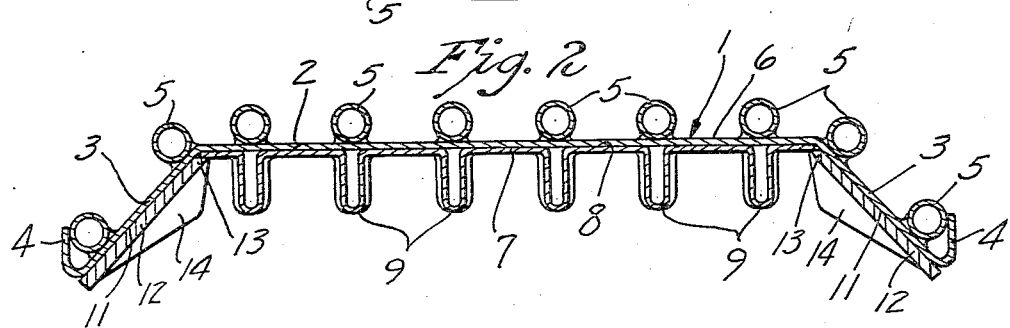
Fig. 2 is an enlarged transverse section of my novel mold.

Referring with greater particularity to the drawings, the numeral 1 indicates an annular mold element formed from sheet steel or the like and having a relatively flat bottom 2 bounded on its opposite marginal edges by radially inwardly axially outwardly diverging tread material confining flanges 3. Preferably, and as shown, the free edges of the confining flanges 3 are bent backwardly upon themselves as at 4 to impart strength to the mold and to receive one of the convolutions of a tubular heating element 5, which is spirally wound about the exterior peripheral surface 6 of the mold element 1 from one confining flange to the other thereof. Nestingly received within the mold element 1 is a matrix member 7 also preferably formed from sheet metal and having a relatively flat face 8 in engagement with the flat bottom 2 of the mold element 1. Matrix member 7 is of a width corresponding to the width of the flat bottom 2 and has radially inwardly projecting design-forming portions intermediate its marginal edges, shown as being in the nature of zigzag ribs 9.

Secured by means of rivets or the like 10 to the inner faces 11 of the confining flanges 3 of the mold element 1 in end-to-end relation and extending completely thereabout are a plurality of segmental matrix sections 12. Preferably, and as shown, the circumferentially extending, axially inner radially outer edge portions 13 of the matrix sections 12 overlie and rest upon the adjacent marginal edge portion of the matrix member 7, so as to seal off and prevent rubber, while in a fluid state, from flowing between the flat bottom 2 of the mold element 1 and the flat inner face 8 of the matrix member 7. As shown, the matrix sections 12 have a depth corresponding approximately to that of the depth of the confining flanges 3 and thus impart great rigidity thereto. Also, matrix sections 12 may have any desired decorative designs thereon, such as the spaced teeth 14 shown which are substantially radially disposed and project generally radially inwardly from the respective matrix section 12 with the axial inner, radially outer end portion thereof also being in overlying engagement with the adjacent marginal edge portion of the matrix member 7.

The structure above described has great rigidity for its weight, is relatively inexpensive to produce, and is conducive to numerous changes in design in accordance with a given individual's desires. In practice, it is formed by first forming the matrix member 7 with the given design elements 9 thereon. Element 7 is formed from flat stock, rolled to a given diameter and the abutting edges thereof welded together. Thereafter, the mold element 1 is formed from flat sheet stock and clamped about the matrix member 7 and its abutting edges welded together, the weld of the former being staggered with respect to the mold of the latter. Finally, the matrix sections are secured by rivets or the like 10 to the confining flanges 3 with the inner edge portions 13 thereof in overlapping relationship to the adjacent marginal edge portion of the matrix member 7, as shown.

My invention has been thoroughly tested and found to be completely satisfactory for the accomplishment of the above objects; and while I have shown a preferred embodiment thereof, I wish it to be specifically understood that same is capable of modification without departure from the scope of the appended claims.

What I claim is:

1. In a device of the class described, an endless annular sheet metal mold having generally radially inwardly projecting axially outwardly diverging circumferentially extending tread material confirming flanges adjacent the marginal edges thereof and a substantially axially flat bottom portion intermediate the tread material confining flanges, a substantially axially flat endless annular matrix member in engagement with and substantially axially and circumferentially co-extensive with the bottom portion of the mold, a plurality of segmental matrix sections extending circumferentially and axially over the entire inner surface of each tread material confining flange with the adjacent axially extending edge portions thereof being in abutting relationship and the circumferentially extending axial inner edge portions thereof being in overlying engagement with the adjacent marginal edge portion of the matrix member to prevent flowage of rubber stock between the mold and the matrix member and means securing said segmental matrix sections to the respective tread material confining flange to retain the segmental matrix sections in said overlying engagement and clamp said matrix member in said engagement with the mold.

2. The device as set forth in claim 1 wherein each of said segmental matrix sections have a radially inwardly projecting substantially radially disposed tooth with the axially inner end portion of each tooth also having overlying engagement with the adjacent marginal edge portion of the matrix member.

References Cited in the file of this patent

UNITED STATES PATENTS

| | | |
|---|---|---|
| 1,007,434 | Destribats | Oct. 31, 1911 |
| 2,024,888 | Shaw | Dec. 17, 1935 |
| 2,228,212 | Heintz | Jan. 7, 1941 |
| 2,331,679 | Hawkinson | Oct. 12, 1943 |